Patented Sept. 19, 1939

2,173,181

UNITED STATES PATENT OFFICE

2,173,181

PLASTIC, MOLDING, AND COATING COMPOSITIONS AND THE LIKE AND METHOD OF MAKING

Jack D. Robinson, Snyder, N. Y., assignor to National Aniline & Chemical Company, Inc., New York, N. Y., a corporation of New York No Drawing. Application May 10, 1937, Serial No. 141,725

5 Claims. (Cl. 106—22)

This invention relates to the use of certain organic ester-ethers of glycerin in plastic compositions, molding compositions, and coating compositions and to the compositions thus produced.

The ester-ethers of glycerin hereinafter described have been found to blend with and modify resin compositions, including cellulose ester and cellulose ether compositions, to reduce their hardness and to impart flexibility. They are particularly suitable for use in lacquers and molding compositions of the cellulose ester type.

In accordance with this invention there is incorporated in plastic resin compositions, especially cellulose ester or ether compositions, a glycerin ester-ether of the type represented by the general formula:

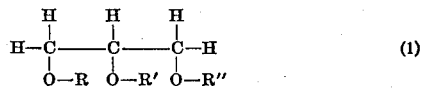

wherein one of the groups R, R' and R'' is a less-than-trinuclear aromatic group either aryl, aralkyl, substituted aryl, or substituted aralkyl, which may have as substituents one or more groups of the alkyl, alkoxy, aralkyl, halogen, nitro, amino, alkyl-amino, dialkylamino, acyl, carboxyl, esterified carboxyl, hydroxy, or esterified hydroxy type, or any combination of the same; another of the groups R, R', and R'' is the acyl group of a mono-carboxylic acid containing less than twenty carbon atoms (especially one free from condensed aromatic nuclei, i. e. a mono-carboxylic acid of the aliphatic or mono-carbocyclic aromatic series) for example, acetic, propionic, butyric, lauric, lactic, benzoic, cresotinic, salicylic acid; and the other (remaining) group is hydrogen or an aromatic or acyl group as above defined.

Glycerin ester-ethers of the above indicated type may be prepared by reactions which are well known to the art as for instance by the interaction of a glycerin-ether with the appropriate acid anhydride or even with the acid itself either with or without a dehydrating substance such as concentrated sulfuric acid or the like.

As illustrative of the methods by which such glycerin ether-esters may be prepared, the following examples are given.

Example 1.—100 parts by weight of alpha-phenyl-glyceryl ether and 150 parts by weght of acetic anhydride are mixed in a vessel fitted with a reflux condenser. The mixture is vigorously agitated, heated until it boils vigorously, and the vapors are condensed and returned rapidly to the reaction vessel. The mixture is kept at the refluxing temperature for about three hours, after which it is distilled in vacuo. The fraction distilling off from 176° C. to 184° C. at 13 mm. pressure is collected as a pale yellow oil whch consists chiefly of the alpha-phenyl-ether of diacetin

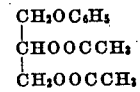

Example 2.—85 parts by weight of alpha-cresyl glyceryl-ether [prepared from glycerin and cresylic acid (a mixture of the ortho, meta, and para cresols)] are mixed with 85 parts by weight of glacial acetic acid and are stirred together and heated for about seven hours at about 100° C. The mixture is then distilled in vacuo, and a pale oil distilling off between 190° C. and 200° C. at 20 mm. pressure is collected, which consists chiefly of the alpha-cresyl-ether of diacetin

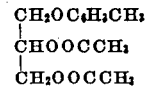

The ester-ethers of glycerin above classified are ordinarily solids or liquids of high boiling point. They may be distilled in vacuo without decomposition, but are liable to undergo some slight decomposition if distilled at atmospheric pressure. They are insoluble in water but are quite soluble in organic solvents such as alcohol, ethyl acetate, acetone, and the like, and are themselves very good solvents for cellulose esters or resinous substances, especially those of the fusible type.

In accordance with the present invention the herein described glycerin ester-ethers may be used as modifying agents (e. g. solubilizing, flexibilizing, softening, or plasticizing agents) and especially as softeners, flexibilizers, or plasticizers for plastic compositions, coating compositions, and molding compositions comprising synthetic plastics such as cellulose derivatives or plastics of natural resins or gums, such as derivatives of shellac, copal, or gum dammar, or plastics of artificial resins such as glyptals or ester gums. For the sake of simplicity all of these materials will be referred to generically as "resins." The mono-ether-di- and mono-esters are somewhat better plasticizers than the di-ether-mono-esters, the latter being of particular value as softeners. The glycerin ester-ethers may be readily incorporated in said compositions, especially in the liquid or molten state, to give homogeneous mixtures. Pigments may be added, if desired. Due to their high boiling points at ordinary pressures and their negligibly low vapor pressures at ordinary temperatures, these ester-ethers are not sufficiently volatile to be eliminated under the usual conditions prevailing in the manufacture and use of said mixtures or in any subsequent treatment to which they ordinarily are subjected. The compositions containing the ester-ethers of this invention are insoluble in and very resistant to water; they are of use in the manufacture of coating or impregnating compositions such as paints, varnishes, dopes, and lacquers, in the making of threads, such as artificial silk, in the manufacture of ribbons, films, sheets, foils, and in the production of a variety of molded products. Compositions comprising the ester-ethers and the lacquer bases, e. g. cellulose esters or ethers, are especially valuable for coating woven fabrics to produce artificial leather.

The glycerin ester-ethers herein described may be incorporated into and are particularly advantageous in plastic compositions comprising lacquer bases, that is, cellulose derivatives such as nitro-celluloses, cellulose ethers, and particularly the acidyl celluloses, such as cellulose acetate, cellulose propionate, and the like, to form compositions which are homogeneous and which are more elastic, tough, and water-resistant than similar compositions formed without the use of a modifier or with the use of modifiers which are characterized by lower boiling ranges and/or greater solubility in water. The compositions thus formed are especially adapted to shaping and molding and are capable of wide application in the manufacture of films, ribbons, foils, sheets, threads, such as artificial silks, dopes, lacquers, plastics, and a variety of molded products.

In making the composition above described, it is preferred to dissolve the cellulose derivative or resinous compound in a suitable solvent or mixture of solvents, and to the solution thus formed add the requisite amount of the desired ester-ether or mixture of ester-ethers of glycerin. The homogeneous solutions which result are evaporated or applied and exposed in a manner to remove the low-boiling solvent, leaving behind the desired plastic compositions. As will be readily understood, the amount and type of modifying agent used in any particular case will depend upon the use to which the resulting composition is to be put.

The preferred plasticizers of this invention are the mono-ether-d- or mono-esters which may be represented by the formula

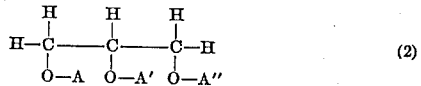

(2)

wherein A represents a less-than-trinuclear aryl group, i. e. a group formed by removal of a nuclear H from a hydrocarbon of the benzene or naphthalene series, and one of the groups A' and A'' is an acyl group of an open chain aliphatic acid (saturated or not) containing less than twenty carbon atoms, particularly acetic, propionic, butyric, lauric, lactic acid, and the like; while the other group is hydrogen or is an acyl group of an aliphatic acid as defined, and of these the ester-ethers which are most available and which yield the best results are the mono- and di-acetic-acid esters of the mono-phenyl, mono-cresyl, mono-alpha-naphthyl, and mono-beta-naphthyl ethers of glycerin, which may be called for the sake of brevity mono-(less-than-2-C-substituted)-aryloxy-glyceryl acetates.

The following examples will serve to more clearly indicate the compositions of this invention and the method by which they may be prepared. It is to be understood, however, that the invention is not limited thereto other than as indicated in the appended claims.

*Example 3.*—5 parts of the alpha-phenyl-ether of diacetin, prepared as set forth in Example 1, and 10 parts of cellulose acetate are dissolved in a mixture of 45 parts of acetone and 40 parts of alcohol. The solution thus formed is stirred to insure homogeneous admixture of the constituents and is then evaporated to remove the low-boiling solvents. The cellulose acetate and the glycerin ester-ether remain as a homogeneous plastic mass which is very elastic, tough, and water-resistant and which is of wide applicability as hereinabove described.

*Example 4.*—5 parts of the beta-naphthyl-ether of diacetin and 10 parts of cellulose acetate are dissolved in 40 parts of acetone and 45 parts of alcohol. The solution thus formed is stirred to insure homogeneous admixture of the constituents and is then evaporated to remove the low-boiling solvents. The desired product remains as a homogeneous elastic but extremely tough, water-resistant plastic mass which is readily adapted to molding or shaping.

*Example 5.*—10 parts (by weight) of cellulose acetate, 45 parts of acetone, and 40 parts of ethyl alcohol may be mixed with from 2 to 15 parts of the following plasticizers, and the resulting homogeneous solutions are thereafter evaporated to obtain plastic masses which are elastic and tough, and are suitable for making films, threads, molding compositions and the like.

Ortho, meta, or para-toluyl ether of glycerine dibenzoate.
Ortho, meta, or para-chlorphenyl ether of glycerin dipropionate.
Diphenyl ether of glycerin naphthoate.
Anisyl ether of glycerin dibutyrate.
Phenyl ether of glycerin di-cyclohexanoate.

The glycerin ester-ethers hereinabove described may also be added to compositions comprising resins, such as the natural resins (shellac, colophony, etc.), or synthetic resins which may be polyhydoxy-polycarboxylic resins of the glyptal type, phenol-formaldehyde resins, such as Bakelite, resins formed from urea and unsaturated acids, para-coumarone, para-indene resins, or resins of the vinyl type. In this connection if the glycerin ester-ether modifiers of this invention be admixed with resins of the fusible type, such compositions may be cured to yield products which are much more elastic, tough, smooth, and water-resistant than is the case when no modifier or a modifier which is characterized by a lower boiling range and/or greater solubility in water is used. Such compositions also are useful in manufacturing coatings or finishes such as paints, varnishes, and the like for wood, metal, or other surfaces.

In preparing plastic compositions of the above described resinous type, the procedure to be followed is similar to that described for the cellulose derivatives, i. e. the resin and modifier may be dissolved in a solvent, such as alcohol, and the resulting solution evaporated to yield a homogeneous, water-resistant, elastic but tough, plastic mass.

The following example will serve to typify the compositions of this type:

Example 6.—40 parts of shellac and 10 parts of the alpha-cresyl-ether of diacetin, prepared as in Example 2, are dissolved in 50 parts of alcohol. The solution is stirred and then evaporated to remove the alcohol. The resulting product is in the form of a homogeneous elastic but tough, water-resistant plastic mass which is readily adapted for making varnishes and the like. Films made therefrom have increased "fullness" and greater resistance than shellac to checking by water.

As will be fully understood by those skilled in the art, the scope of this invention is not restricted to the examples hereinabove given, but changes may be made in the constituents and the proportions of said constituents without departing from the scope of the invention. The invention is applicable to mixed compositions prepared from one or from a mixture of two or more of the resin, gum, or lacquer types enumerated above, and one or a mixture of two or more of the ester-ethers of glycerin herein described.

It will be fully understood, furthermore, that the compositions hereinabove described and exemplified may be further extended within the scope of this invention to include materials such as thinners, solvents, fillers, dyes, and the like, the inclusion of which depends upon the particular use to which the compositions in question are to be put.

I claim:

1. A composition comprising a material of the group consisting of resins, gums, cellulose esters, and cellulose ethers and as a plasticizer for said material a compound of the group consisting of aryl ethers of glyceryl mono- and di-acetates, propionates, butyrates, laurates, lactates, benzoates, cresotinates, salicylates, naphthoates, and cyclohexanoates.

2. A composition comprising cellulose acetate and a relatively small proportion of a mono-aryl ether of a glyceryl mono-acetate containing not more than one aliphatic carbon as a substituent in the aryl radical.

3. A composition comprising cellulose acetate and a relatively small proportion of a mono-aryl ether of a glyceryl di-acetate containing not more than one aliphatic carbon as a substituent in the aryl radical.

4. In the preparation of a cellulose acetate composition, the improvement which comprises dissolving in an inert solvent the cellulose acetate and a mono-aryl ether of a glyceryl mono-acetate containing not more than one aliphatic carbon substituent in the aryl radical and evaporating off solvent from the solution.

5. In the preparation of a cellulose acetate composition, the improvement which comprises dissolving in an inert solvent the cellulose acetate and a mono-aryl ether of a glyceryl di-acetate containing not more than one aliphatic carbon substituent in the aryl radical and evaporating off solvent from the solution.

JACK D. ROBINSON.